United States Patent
Ljunggren

(10) Patent No.: US 8,932,374 B2
(45) Date of Patent: Jan. 13, 2015

(54) METHOD AND EQUIPMENT FOR PRODUCING HYDROGEN FROM BIOMASS

(75) Inventor: Rolf Ljunggren, Sollentuna (SE)

(73) Assignee: Cortus AB, Kista (SE)

( * ) Notice: Subject to any disclaimer, the term of this patent is extended or adjusted under 35 U.S.C. 154(b) by 1066 days.

(21) Appl. No.: 12/996,791

(22) PCT Filed: Jun. 11, 2009

(86) PCT No.: PCT/SE2009/000296
§ 371 (c)(1),
(2), (4) Date: Jan. 20, 2011

(87) PCT Pub. No.: WO2009/151368
PCT Pub. Date: Dec. 17, 2009

(65) Prior Publication Data
US 2011/0117006 A1    May 19, 2011

(30) Foreign Application Priority Data

Jun. 12, 2008    (SE) .................................... 0801369

(51) Int. Cl.
*C10J 3/46*    (2006.01)
*C10J 3/00*    (2006.01)
(Continued)

(52) U.S. Cl.
CPC .... *C10J 3/62* (2013.01); *C10J 3/80* (2013.01); *C01B 3/16* (2013.01); *C10K 3/04* (2013.01); *C10J 3/721* (2013.01); *C10J 3/726* (2013.01); *B01D 53/229* (2013.01); *C10J 2300/0909* (2013.01); *C10J 2300/0916* (2013.01); *C10J 2300/0943* (2013.01);
(Continued)

(58) Field of Classification Search
USPC ....................................................... 48/197 R
See application file for complete search history.

(56) References Cited

U.S. PATENT DOCUMENTS

| 3,759,677 A | 9/1973 | White |
| 4,497,637 A | 2/1985 | Purdy et al. |

(Continued)

FOREIGN PATENT DOCUMENTS

| JP | 4-96995 A | 3/1992 |
| WO | 03/035545 A1 | 5/2003 |
| WO | 2008/073021 A1 | 6/2008 |

OTHER PUBLICATIONS

International Search Report, dated Sep. 28, 2009, from corresponding PCT application.

*Primary Examiner* — Matthew Merkling
(74) *Attorney, Agent, or Firm* — Young & Thompson

(57) ABSTRACT

A method and equipment for producing hydrogen from biomass includes the stages of drying of the biomass, gasification of the biomass, and water gas shift reaction. The method further includes: subjecting the outgoing gases ($CO_2$, $N_2$ and $H_2O$) from the gasification stage to a first heat exchange, wherein the outgoing gases are cooled; evaporating water with heat from outgoing gases; subjecting the steam to heat exchange wherein the steam is heated; reducing the steam to synthesis gas, wherein the synthesis gas is cooled and the air supply to the gasification is heated; separating the synthesis gas into a hydrogen stream and a carbon monoxide stream; reacting the carbon monoxide with water steam to carbon monoxide and hydrogen; separating also these secondary streams into a hydrogen stream and a carbon monoxide stream; and bringing together the primary and secondary hydrogen stream into a product stream.

8 Claims, 2 Drawing Sheets

(51) Int. Cl.

| | | |
|---|---|---|
| *C01B 6/24* | (2006.01) | |
| *C10J 3/62* | (2006.01) | |
| *C10J 3/80* | (2006.01) | |
| *C01B 3/16* | (2006.01) | |
| *C10K 3/04* | (2006.01) | |
| *C10J 3/72* | (2006.01) | |
| *B01D 53/22* | (2006.01) | |
| *C10K 1/02* | (2006.01) | |

(52) U.S. Cl.
CPC . *C10J 2300/0973* (2013.01); *C10J 2300/1853* (2013.01); *C10J 2300/1892* (2013.01); *C01B 2203/043* (2013.01); *C01B 2203/0475* (2013.01); *C10J 2300/0956* (2013.01); *C10K 1/024* (2013.01); *C10J 2300/094* (2013.01); *C10J 2300/0976* (2013.01); *C10J 2300/1621* (2013.01); *C10J 2300/1659* (2013.01); *B01D 2256/16* (2013.01); *B01D 2257/502* (2013.01)
USPC .................. 48/197 R; 423/644; 423/650

(56) References Cited

U.S. PATENT DOCUMENTS

| | | |
|---|---|---|
| 6,133,328 A | 10/2000 | Lightner |
| 6,991,769 B2 | 1/2006 | Kaneko et al. |
| 2007/0214719 A1 | 9/2007 | Yoshikawa |
| 2008/0014126 A1 | 1/2008 | Bender et al. |

METHOD AND EQUIPMENT FOR PRODUCING HYDROGEN FROM BIOMASS

FIELD OF THE INVENTION

The present invention concerns a method for producing hydrogen from biomass, said method comprising the stages of drying of the biomass, gasification of the biomass and subsequent gas treatment. The present invention also concerns an equipment for carrying out the method of the present invention.

This new method of gasification of biomass based on gas generators, gas scrubbing and heat recovery will become more effective than any known technical solution and could be used from a medium-large scale (community) to a large scale (industrial).

PRIOR ART

Gasification of biomass is an important source of "green" energy. This is due primarily to its ability to be both renewable and to not contribute to emission of carbon dioxide to the atmosphere. Hydrogen is an energy carrier not producing any emissions upon combustion. Hydrogen is a desirable fuel for vehicles, industries and electricity generation.

Efforts to find the most effective method of gasification of biomass (wood) are proceeding intensively around the world. Most gasification initiatives come from boilers where steam and electricity are obtained at the same time as gasification. This method is aimed at heat generation and recovery without steam formation.

From JP 4 096 995 a method is already known for production of gas with high energy content, wherein said production starts from a mixture of coke oven gas and converter gas. Oxygen gas is added to the mixture. In a subsequent phase, methane gas is produced. In a concluding phase of the production of gas with high energy content, the nitrogen gas component is removed by cryogenic separation.

OBJECTS AND FEATURES OF THE INVENTION

The most important object of the present invention is to provide a method for production of hydrogen gas from renewable raw materials in the form of biomass.

Another object of the present invention is to eliminate nitrogen from the combustion gases.

Yet another object of the present invention is to reduce the cleaned gas, i.e., the gas from which nitrogen has been removed.

Yet another object of the present invention is to implement a number of heat exchange steps during the process.

At least the primary object of the present invention is realised by a method having the characterising features according to the independent claims. Preferred embodiments of the invention are defined in the dependent claims.

BRIEF DESCRIPTION OF FIGURES

One preferred embodiment of the invention is described below, referring to the enclosed figures, where.

DETAILED DESCRIPTION OF A PREFERRED EMBODIMENT OF THE INVENTION

Figure 1:
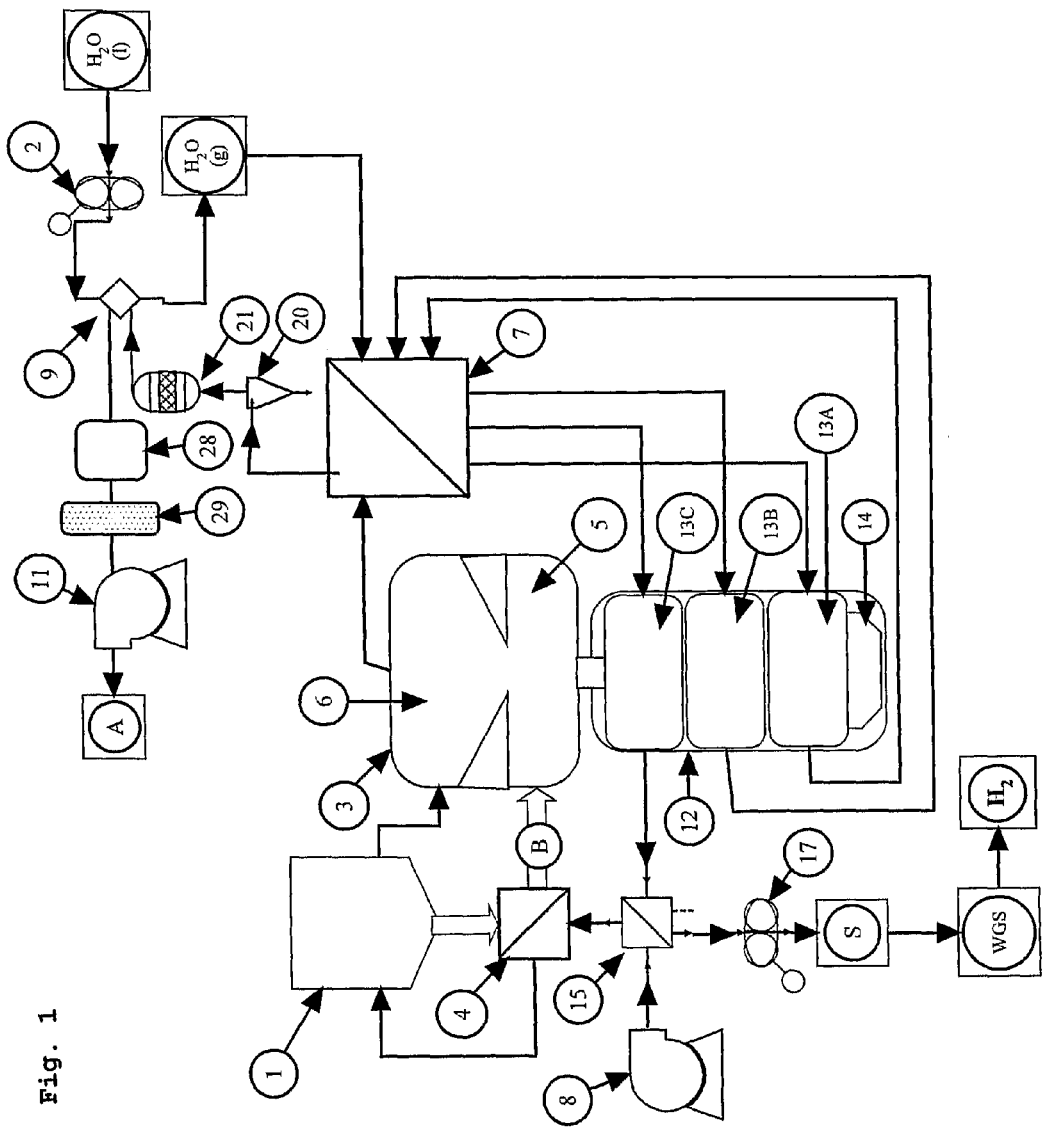
FIG. 1 shows a flow chart of a preferred embodiment of the present invention, wherein said chart also shows schematically the units forming an equipment to carry out the method.

FIG. 1 shows schematically a number of units making up the equipment to carry out the method. The conduits, pipes, etc., which link together the units of the equipment are not described or shown in detail. The conduits pipes, etc. are appropriately configured to fulfil their function, i.e., to transport gases and solids between units of the equipment.

The equipment comprises a storage unit 1 for the biomass. Biomass is usually either wood or crops which are grown and harvested especially for this purpose or by-products from the pulp and paper or other industries. The storage unit 1 is designed to let a stream of heated air pass through the storage unit to dry the biomass. Biomass has certain disadvantages as a fuel, since it is harvested with a very high water content (moisture), which lowers its caloric value and requires drying prior to its use. Many by-products are converted into pellets to simplify the handling (before and after drying). It is also possible to make coke from the wood and obtain a cleaner energy source.

The equipment also comprises a reactor unit 3 which in turn comprises a pyrolysis chamber 5 and an afterburner chamber 6, both of said chambers generally being outfitted with a ceramic lining. The equipment also comprises a first regenerator device 7 which is interconnected with the afterburner chamber 6 in the reactor unit 3. The purpose of the first regenerator device 7 is heat exchange at extremely high temperatures, i.e., on the order of 1500-1600° C. In general, a regenerator comprises ceramic material. The first regenerator device 7 is also interconnected with an evaporator 9 which is included in the equipment of the present invention. The first regenerator device 7 and the evaporator 9 together form a first heat exchanger means. The evaporator 9 is interconnected with a gas scrubber, which also forms part of the equipment of the present invention.

An air blower 8 is interconnected with a second regenerator device 15, said air blower 8 being part of the equipment of the present invention. The second regenerator device 15 is also connected to pyrolysis chamber 5 via heat exchanger device 4 so that heat from the heated air is supplied from the air blower 8 to the pyrolysis chamber 5 and the remaining heat goes to drying of the biomass in the storage unit 1. This air flow from the second regenerator 15 via heat exchanger device 4 to pyrolysis chamber 5 through the drying in the storage unit 1 will carry along particles and possibly gases for combustion in the afterburner chamber 6 in the reactor unit 3.

After the gas scrubbers 28 and 29 and the evaporator 9, a rotating fan 11 is provided, said rotating fan 11 being part of the equipment of the present invention. Thus, the gas scrubbers 28 and 29 are interconnected with the rotating fan 11 and the rotating fan 11 in turn is interconnected with the evaporator 9 and the first regenerator device 7.

The equipment of the present invention also comprises a reduction shaft 12 which is interconnected with the combustion chamber 5 at reactor unit 3. The reduction shaft 12 is divided into a number of compartments 13A-13C, each compartment 13A-13C constituting a reduction stage. A ceramic valve (not shown) governs the transport of coke fuel from the combustion chamber 5 to the reduction shaft 12. At the bottom of the reduction shaft 12 there is a slag pocket 14, where the remaining ash and slag is collected.

In immediate proximity to the reactor unit 3 and reduction shaft 12 there is a second heat exchanger means in the form of a second regenerator 15 which is connected to both the combustion chamber 5 and the reduction shaft 12. The second regenerator 15 is included in the equipment of the present invention. The second regenerator 15 is also connected to a compressor 17, said compressor 17 being included in the equipment of the present invention. The air blower 8 blows air into the second regenerator 15 while the compressor 17 sucks synthesis gas S from the second regenerator 15.

The exhaust gases from the reactor unit 3 go through a cleaning system comprising a cyclone 20 which is connected to a catalytic reactor 21, also included in the cleaning system. The catalytic reactor 21 is connected to the evaporator 9 which is also connected to a first filter 28 which is preferably an electro static precipitator, said first filter 28 being included in the cleaning system. The first filter 28 can be connected to a scrubber 29 which is included in the cleaning system.

Figure 2:
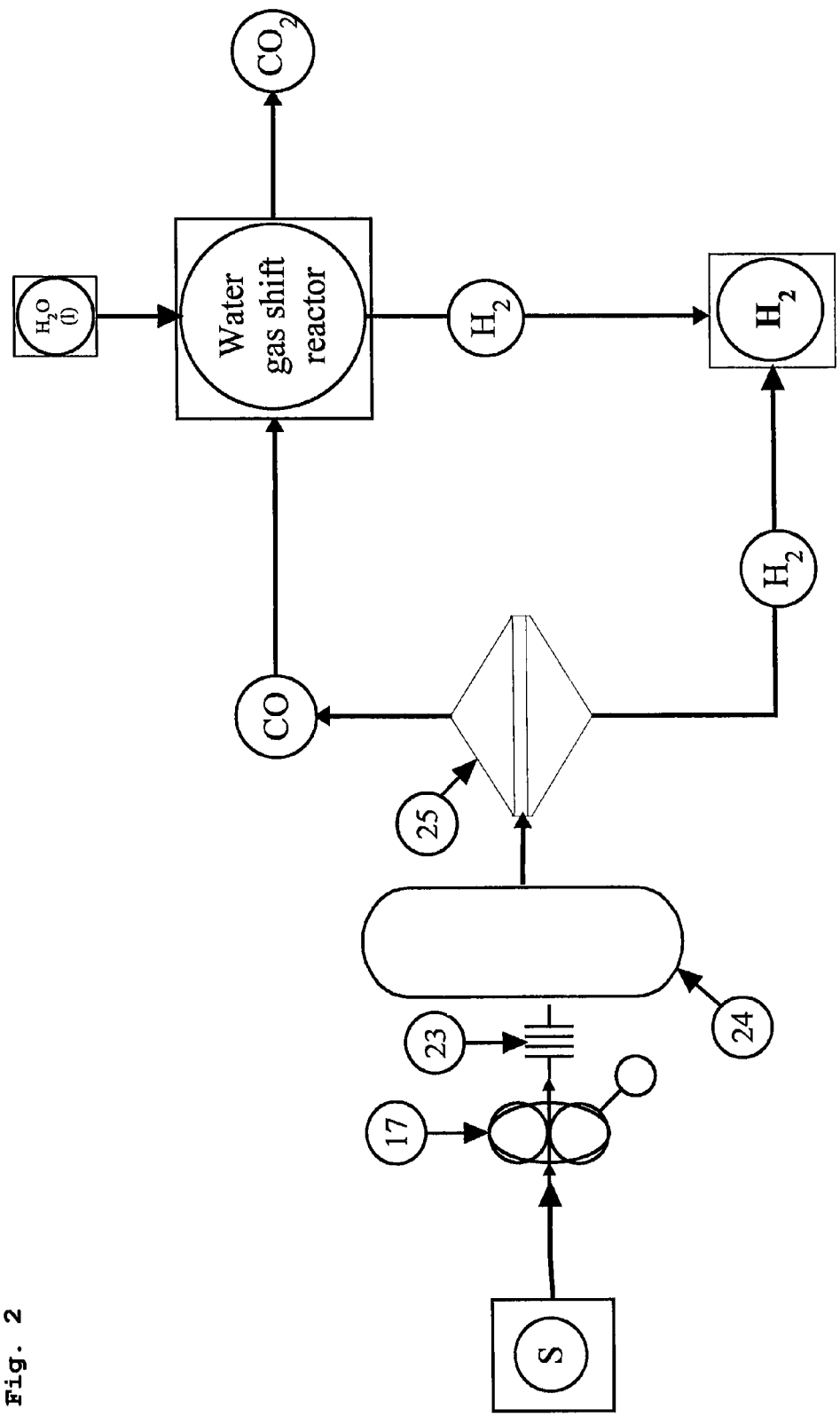
FIG. 2 shows a flow chart of a preferred embodiment for hydrogen enrichment and gas separation by the present invention, wherein said chart also shows schematically the units forming an equipment to carry out the hydrogen enrichment and separation method.

FIG. 2 shows the gas separation and water gas reactor units in more detail. A compressor 17 which is included in the gas separation and water gas reactor units is connected to a second filter 23 which is included [in] the gas separation and water gas reactor units. The second filter 23 is preferably a mechanical filter. The second filter 23 is connected to a tank 24 which is part of the gas separation and water gas reactor units. The tank 24 is suitable for maintaining an excess pressure, said excess pressure being generally on the order of around 7-11 bar. The tank 24 is connected to a membrane 25 which is part of the gas separation and water gas reactor units. In the membrane 25, the outgoing gas flow is divided into carbon monoxide CO and hydrogen $H_2$. The membrane 25 is connected to a water gas shift reactor where the remaining carbon monoxide is made to react catalytically with steam under highly increased pressure and temperature, so the remaining carbon monoxide is oxidised by the steam to hydrogen and carbon dioxide. The reaction occurs preferably in two different temperature stages with different catalyst material and to fully transform the carbon monoxide into the reaction products of hydrogen and carbon dioxide. The gases are separated normally by the adsorption technique in the form of PSA (Pressure Swing Adsorption), resulting in two totally separate streams with high purity and degree of separation.

FIG. 1 describes the method of the present invention by means of a flow chart. The notion of the invention is to gasify the biomass so as to produce in a first stage a synthesis gas $S(H_2/CO)$ with a high caloric value, where overheated steam is reduced to synthesis gas $S(H_2/CO)$. The flow chart for the process in FIG. 1 describes a state where the method of the present invention is running continuously. In practice, however, it is necessary to start the process from a cold state for both the biomass and the equipment in order to carry out the method of the present invention. This is done preferably by use of a gas burner. This burner will preheat and store energy in the ceramic lining of the combustion chamber 5 and in the reduction shaft 12. This preheating is done until the temperature setpoint has been reached (over 1000° C.) and the process meets its own energy needs. The preheating fuel is preferably in gas form. Actually, any desired fuel which adequately preheats the equipment can be used.

The continuous process of the present invention is described below, with reference to the flow charts of FIG. 1 and FIG. 2.

In the first stage, the biomass is dried with incoming heated air, which goes to a combustion stage in the process as described below. The dried biomass is taken down to the pyrolysis chamber 6 at reactor unit 3. This is shown by arrow B in FIG. 1. The preheated air for a combustion stage has a high capacity for drying of the biomass. The water steam can be collected and used in a reduction stage of the process as described below.

The second stage is conducted in reactor unit 3, where first pyrolysis and then combustion (oxidation) occurs in the ceramic-insulated chambers 5 and 6. Preheated air, from the air blower 8 and the second regenerator 15, first heats the fuel to drive the pyrolysis, drive off volatile substances, and partially burn the fuel to form a coke residue (which is used for the third stage) and flammable gases. The light flammable substances are pyrolysed first with heated air and incomplete combustion until only carbon (coke) remains. By injection of preheated air, from the first air blower 8 and the second regenerator device 15, the combustion of the gases is completed in an afterburner chamber 6, where superheated air completely burns all gases and volatile substances. The air is heated by regenerative means from the outgoing synthesis gases S. The combustion process is regulated by maintaining the outgoing oxygen at a particular level and temperature of around 1500-1600° C. This combustion leaves the major part of the carbon out of the reaction until it is taken down to the third stage. Heavy components (tar) and complex components (aromatics) can be disrupted at the high temperatures in the after-burner chamber 6 and be taken to the exhaust phase in the form of elemental $CO_2$ and $H_2O$.

The outgoing gases ($CO_2$, $N_2$ and $H_2O$) from the afterburner chamber 6 preferably have a temperature over 1600° C. These outgoing gases pass through the first regenerator device 7 where a heat exchange occurs, i.e., the outgoing gases are cooled, preferably to 250-300° C., while water steam from the evaporator 9 is heated, preferably to around 1500° C. Treatment of the steam is described more fully below.

The cooled outgoing gases ($CO_2$, $N_2$ and $H_2O$) now pass through an evaporator 9 where further cooling occurs, preferably to around 150° C., and from the evaporator 9 the outgoing gases ($CO_2$, $N_2$ and $H_2O$) flow to the gas scrubbers 28 and 29.

In the gas scrubbers 28 and 29, the outgoing exhaust gases are cleaned of particles and emissions which are regulated (NOx, SOx).

The outgoing exhaust gases ($CO_2/N_2$ and $H_2O$) from the first heat exchanger 7 flow through the cyclone 20 to remove the coarse material from the outgoing gases ($CO_2$, $N_2$ and $H_2O$). Then the outgoing gases ($CO_2$, $N_2$ and $H_2O$) go through the catalytic reactor 21, through the evaporator 9, [and] through the first filter/electric filter 28. The catalytic reactor traps all $NO_x$ from the combustion. One must hold the temperature at around 250° C. and add ammonia ($NH_4$) to drive the catalytic reaction. When the reduction of $NO_x$ is complete, only pure nitrogen and water steam remain. The electro static precipitator 28 traps all particles from the combustion. Then the outgoing exhaust gases ($CO_2$, $N_2$ and $H_2O$) go to the dryer 1 where the heat is used for drying of incoming biomass.

The synthesis gas S goes through the second regenerator 15 and is compressed in compressor 17 after which they go through a mechanical filter 23 before arriving at the tank 24, where a suitable excess pressure prevails. The compressed synthesis gas S flows from the tank 24 through the membrane 25 where the outgoing gases (CO and $H_2$) are divided into pure hydrogen and pure carbon monoxide at high pressure. The carbon monoxide (CO) makes up around 50% of the synthesis gas, while hydrogen ($H_2$) makes up the rest.

Water is fed to a pump 2 and then forced up in temperature by the evaporator 9 to the gas phase (steam). The gas then passes through the first regenerator device 7 where the temperature is raised substantially, preferably up to a level of around 1500° C. The heated steam then undergoes reduction in the reduction shaft 12. The reduction is carried out in several stages, each reduction stage being done in a reduction compartment 13A-13C.

In this way, the heated steam is reduced during a first reduction stage in the first reduction compartment 13A, said compartment being the lowermost compartment in the reduction shaft 12. In the first reduction compartment 13A the steam reacts with the coked fuel from the combustion chamber 5, said coked fuel being taken down through the reduction shaft 12. In this regard it will be noted that after the coked fuel has passed through all the above reduction compartments the coked fuel has become depleted during its travel through the reduction compartments 13C-13A in the reduction shaft 12. However, since the content of $H_2O$ is relatively high, the coked fuel in reduction chamber 13A is ready to carry out a proper reduction of the steam, i.e., the outcome of the reduction is a partially reduced synthesis gas S.

When the steam has been treated in the first reduction stage, i.e., it has gone through the reduction compartment 13A, the partly reduced synthesis gas S is fed back to the first regenerator device 7. When the partly reduced synthesis gas S again goes through the first regenerator device 7 the temperature of the partly reduced synthesis gas S is raised to a level of around 1500° C. The heated, partly reduced synthesis gas S again undergoes reduction, this being done by making the partly reduced synthesis gas S go through the second reduction compartment 13B where a similar reduction occur to that described in connection with the first reduction compartment 13A. Since the coked fuel is less depleted in the second reduction compartment 13B, as compared to the first reduction compartment 13A, a proper reduction occurs in the second reduction compartment 13B even if the gas content of $H_2O$ in the partly reduced synthesis gas S is lower than during the first reduction stage. The partly reduced synthesis gas S leaving the second reduction chamber 13B will be reused for the first regenerator device 7. The partly reduced synthesis gas S will again be subjected to a temperature rise when the partly reduced synthesis gas S goes through the first regenerator device 7, preferably to around 1500° C.

The reduction process now continues with yet another reduction stage. The equipment as shown in FIG. 1 has yet another reduction chamber 13C. This means that yet another reduction stage is carried out in the same way as described above.

Thanks to the overheating of the partly reduced synthesis gas S between each reduction stage, the driving force is sufficient for the reaction and nearly all the $H_2O$ is reduced to CO and $H_2$.

When the partly reduced synthesis gas S has gone through the last reduction stage, the partly reduced synthesis gas S has turned into a completely reduced synthesis gas S, which is sucked through the second regenerator 15, cooling the synthesis gas S. The synthesis gas S is made up of a mixture of CO and $H_2$. This gas can be further refined to liquid biofuel, e.g., by a Fischer-Tropsch process or the like.

The synthesis gas S is compressed in compressor 17, cleaned in the filter 23 and separated via the membrane 25 to a hydrogen stream ($H_2$) and a carbon monoxide stream (CO). This hydrogen is half of the outgoing product. The carbon monoxide stream is taken through a water gas shift reactor along with water. The carbon monoxide (CO) is transformed into carbon dioxide ($CO_2$) by reacting with the oxygen in the water steam, which in turn becomes hydrogen. By letting the water gas shift reaction occur at both high and low temperature, an almost complete transformation of the gas can be done.

The two gases are separated preferably by adsorption technique (PSA) into two separate streams where the carbon dioxide is a residual product and the hydrogen forms the other half of the product stream.

It is necessary to maintain dilution between the stages as low as possible to maintain the process effective. If the combustion gases are taken to the reduction stage there will be a dilution with nitrogen and a decrease in the caloric content of the outgoing products. This requires a regulating of gases and pressure to achieve full capacity for the process and the pressure regulation is the key to this.

The pressure in the system is used to minimise the dilution between the three stages of drying, combustion and reduction. This is also necessary when the mass transfer of solids is open between the three stages. For this reason, the pressure in the combustion chambers (stage two) is the lowest, followed by the reduction chamber, to minimise the transfer of gases between these two stages. The drying will have a higher pressure than the other two stages to prevent hot gases from escaping by mistake.

To illustrate the effectiveness of the method of the present invention as compared to a conventional gas production generator, see the following table:

TABLE 1 data for a conventional gas generator compared to the present invention.

|  | Conventional (generator gas) | Product gas from gasification of bio-mass (synthesis gas) | Final hydrogen after water gas shift reaction and separation |
| --- | --- | --- | --- |
| $H_2$ | 4% | 50% | 100% |
| CO | 28% | 50% | <2000 ppm |
| $CO_2$ | 8% | 0% |  |
| $N_2$ | 60% | 0% |  |
| caloric content (MJ/m$^3$) | 3.92 | 11.37 | 10.62 |

SUITABLE MODIFICATIONS OF THE INVENTION

By adding oxygen and enriching the afterburner stage it should be possible to further improve the process. It would be necessary to balance the heat load of the outgoing gas against the heat needed at the reduction stage. A higher concentration of $CO_2$ would be the result up to the gas cleaning, enabling a somewhat easier and more energy-effective cleaning of a lower mass flow.

The embodiment of the equipment shown in FIG. 1 has three reduction chambers. However, within the scope of the present invention the number of reduction chambers can be more or less than three. In general, the number of reduction chambers will not be fewer than two or more than five.

In the method and equipment described above, a membrane technique is used to clean the outgoing gases. However, other gas separation techniques are possible within the scope of the present invention.

Molecular sieves (English: Pressure Swing Adsorption (PSA)) are an alternative method where gases under pressure feed zeolites and activated charcoal to separate nitrogen from gas streams. Gas cleaning by this method requires the water to be separated before the cleaning and with this process it is necessary to restore this water to the process in the reduction stage.

As an alternative to the first filter/electric filter 28 in the cleaning unit, the collected dust can be fed back to the combustion chamber 5.

In the above description of the method of the present invention, it is presented as a method driven primarily under ambient pressure. If a larger unit is built, it can and will be possible to increase the pressure and thereby achieve greater density for the entire process. In practice, this means less steel and refractory material per production unit, i.e., lower investment per synthesis gas unit produced.

The most important changes to the equipment will be that the fans and blowers need to be compressors and turbines. Reactor unit 3 will consist of a pressure vessel. All pipelines have to be adapted to the actual pressure. The regenerators need to be more pressure-secure and the gas cleaning equipments have to be modified.

To lower emissions to the surroundings, air can be used for drying of incoming biomass. The air will then be heated by outgoing exhaust gases from the afterburner stage or the synthesis gas from the gasification of the biomass. The particles and gases given off in the drying stage can then be burned in the afterburner state.

The invention claimed is:

1. A method for production of hydrogen from biomass, wherein said method comprises the stages of drying of the biomass and gasification of the biomass, the gasification including pyrolysis of the biomass, wherein coked fuel is formed by pyrolysis of the biomass, characterised by the further stages of subjecting outgoing gases from the gasification stage to a first heat exchange, the outgoing gases including carbon dioxide, nitrogen and steam, wherein the outgoing gases are cooled, water is evaporated in an evaporation stage by means of the caloric content of the outgoing gases, steam is subjected to heat exchange wherein steam is heated, steam is reduced to a synthesis gas consisting of hydrogen and carbon monoxide, this reduction occurs by reaction with the coked fuel, and the synthesis gas is subjected to gas separation to obtain pure hydrogen.

2. The method according to claim 1, wherein, in a further treatment stage, the carbon monoxide is subjected to water gas shift reaction, and supplied steam forms hydrogen with carbon dioxide as residual product, and the hydrogen is separated from the carbon dioxide in a final gas separation stage.

3. The method according to claim 1, wherein the synthesis gas obtained during the reduction undergoes heat exchange, and wherein the synthesis gas is cooled and the air used in combustion is heated.

4. The method according to claim 1, wherein the cooling of the gases emerging from the gasification and the heating of the steam are done in a common heat exchange stage.

5. The method according to claim 1, wherein the cooling of the gases emerging from the gasification with heat exchange is done in two separate stages.

6. The method according to claim 1, wherein the reduction of steam to synthesis gas is done in at least two stages.

7. The method according to claim 6, wherein a reaction with coked fuel from the gasification is initiated at the first reduction stage of synthesis gas, and said coked fuel has participated in the preceding reduction stage.

8. The method according to claim 2, wherein the synthesis gas obtained during the reduction undergoes heat exchange, wherein the synthesis gas is cooled and the air used in combustion is heated.

* * * * *